United States Patent [19]

Imataki et al.

[11] 4,308,566

[45] Dec. 29, 1981

[54] LIGHTNING ARRESTER DEVICE FOR POWER TRANSMISSION LINE

[75] Inventors: Mitsumasa Imataki; Kazuo Sakamoto, both of Amagasaki, Japan

[73] Assignee: Mitsubishi Denki Kabushiki Kaisha, Tokyo, Japan

[21] Appl. No.: 109,218

[22] Filed: Jan. 3, 1980

[30] Foreign Application Priority Data

Jan. 11, 1979 [JP] Japan .................................. 54-2710

[51] Int. Cl.[3] .............................................. H02H 1/04

[52] U.S. Cl. .................................... 361/125; 361/124; 361/132

[58] Field of Search ............... 361/132, 131, 125, 124, 361/117, 134, 133, 40, 135; 337/28, 31, 17, 18

[56] References Cited

U.S. PATENT DOCUMENTS

| | | | |
|---|---|---|---|
| 2,158,859 | 5/1939 | Horikoshi | 361/125 |
| 2,305,436 | 12/1942 | McMorris | 361/124 X |
| 2,971,132 | 2/1961 | Nash | 361/124 |
| 3,806,765 | 4/1974 | Matsuoka et al. | 361/128 |

*Primary Examiner*—J. D. Miller

*Assistant Examiner*—Reinhard J. Eisenzopf

*Attorney, Agent, or Firm*—Oblon, Fisher, Spivak, McClelland & Maier

[57] ABSTRACT

A lightning arrester device for power transmission line comprises a lightning arrester comprising a sintered product made of a main component such as zinc oxide; a serial connection of a reactor and a fusible wire connected to the lightning arrester in series and a gap connected in parallel with the serial connection. The lightning arrester is disconnected from a power transmission line when the lightning arrester is broken.

5 Claims, 5 Drawing Figures

LIGHTNING ARRESTER DEVICE FOR POWER TRANSMISSION LINE

BACKGROUND OF THE INVENTION

The present invention relates to a lightning arrester device for power transmission line positioned on a steel tower to protect the power transmission line; more particularly, it relates to a lightning arrester device which performs the disconnection of a lightning arrester from the power transmission line at the time of the fault of the lightning arrester.

In general, an aerial ground wire is positioned on the power transmission line to protect it from the attacking of direct lightning. However, when the lightning current is large, the electric potential of the steel tower which is normally in ground potential increases. Therefore, a so called reverse flashover is caused by the elevation of the electric potential over the voltage of the power transmission line whereby the earthing condition results in the system to pass the earth current. Therefore, it has been proposed to cut-off the earth current with a circuit interrupter connected to the power transmission line and then re-close the circuit interrupter.

In a new power transmission line for high voltage and large capacity power transmission, the critical capacity for power transmission depends upon a transient stability of the system at the reclosing time of the circuit interrupter.

In order to improve the transient stability, it is necessary to prevent the trouble of the reverse flashover. One attempt was to connect the lightning arrester device to the power transmission line. As is well known, the conventional lightning arrester device has a structure connecting a serial gap and a functional element made of silicon carbide (SiC) in series. The floating capacity of the serial gap is usually small as 10 PF and accordingly, the discharge characteristic of the gap is easily changed depending upon the condition of the surface such as a dust and a broken surface condition of the insulator which holds a lightning arrester element. Thus, it is necessary to work periodically for a maintenance. When a functional element made of silicon carbide is used, several hundreds Amp. of a dynamic current is passed under the normal voltage to ground, and accordingly, a perfect earth current cancellation can not be disadvantageously attained. Therefore, this conventional lightning arrester device has not been practically applied in the power transmission line.

Recently, a sintered product made of a main component of zinc oxide (ZnO) and a minor component such as bismuth, antimony, cobalt, etc. (hereinafter referring to as ZnO element) has been developed. The ZnO element has an excellent non-linearity of voltage-current characteristic and a lightning arrester element can be prepared by using the ZnO element so as to decrease a leakage current passed in the insulator under the normal voltage to ground to several tens $\mu$Amp. Accordingly, it is no longer necessary to form the serial gap required in the conventional lightning arrester. The disadvantage found in the application of the conventional lightning arrester device to the power transmission line can be overcome by using a zinc oxide type lightning arrester device. That is, the dynamic current of several hundreds Amp. as found in the conventional device is not passed under the normal voltage to ground and it can be considered as a non-dynamic current type lightning arrester device. Accordingly, no disturbance results in the power transmission line system because the lightning arrester device responds to only the pulse of the lightning current.

Furthermore, the lightning arrester device has not the serial gap found in the conventional device whereby the lightning arrester device has a stable performance without being affected by external conditions.

However, even though it is the ideal lightning arrester device as above-mentioned, it absorbs an abnormal voltage caused by the lightning. The lightning arrester should be sometimes able to treat a current higher than the estimated lightning current even though the possibility of the occurrence is low. In such case, the ZnO element may be broken. When the ZnO element is broken, the ON stage results between the terminals of the device and the earth current is passed under the normal voltage to ground. It is necessary to disconnect immediately the lightning arrester device from the power transmission line system when this abnormal condition is caused.

SUMMARY OF THE INVENTION

It is an object of the present invention to provide a lightning arrester device for power transmission line which comprises a lightning arrester comprising a sintered product made of a main component such as zinc oxide and a simple and compact disconnecting means for disconnecting the lightning arrester electrically broken from the power transmission line thereby preventing the trouble such as a reverse flashover.

It is another object of the invention to provide a lightning arrester device for power transmission line which comprises a serial connection of a lightning arrester, a reactor and a fusible wire and a gap connected in parallel to the serial connection of the reactor and the fusible wire which are connected between a transmission line and the ground i.e. a steel tower so that a lightning impulse passes through the gap and an earth current passed through the reactor to the fusible wire thereby disconnecting the lightning arrester from the power transmission line by the melting of the fusible wire.

BRIEF DESCRIPTION OF THE DRAWINGS

The same reference numerals designate the same or corresponding parts throughout several drawings.

DETAILED DESCRIPTION OF THE PREFERRED EMBODIMENTS

Figure 1:
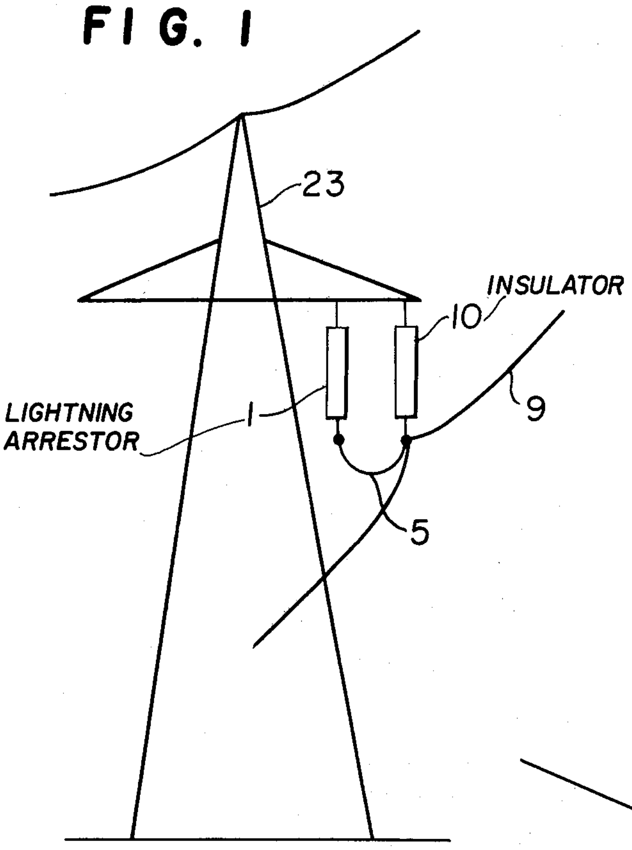
FIG. 1 is a schematic view showing an application of the conventional lightning arrester device for power transmission line.

The drawings show the conventional lightning arrester device (1) wherein a power transmission line (9) is supported through a suspension insulator (10) by a steel tower (23) and one end of the lightning arrester (1) is connected to the steel tower and the other end is connected through a fusible wire (5) to the power transmission line (9). It is usual to use the fusible wire (5) for the disconnection of the lightning arrester (1) from the power transmission line when a fault occurs. However, the fusible wire is melted by a lightning current. Accordingly, the size of the fusible wire is selected so as to be melted by an earth current when a fault occurs.

The lightning current treated by the lightning arrester device for power transmission line is generally in the range of 100 KAmp. to 150 KAmp. and has the waveform in which the duration of wave is about 2 $\mu$Sec. and the duration of wave tail is about 70 $\mu$Sec. On the other hand, the earth current passed at the time of a fault in the lightning arrester device varies depending upon the power transmission line system and is in the range from about 200 Amp. to about 50 KAmp. If the earth current of 200 Amp. is passed for 0.1 second, the energy is smaller than the lightning current of 100 KAmp. Accordingly, the fusible wire is melted by the passing of the lightning current thus preventing the disconnection of the lightning arrester device from the power transmission line.

The present invention is to overcome the disadvantage in the conventional device.

An embodiment of the present invention will be described with reference to FIGS. 2 to 4.

Figure 2:
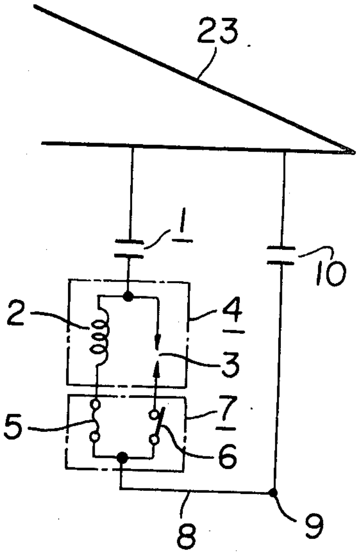
FIG. 2 is a diagram of the equivalent circuit of an embodiment of the lightning arrester device for power transmission line of the present invention.
Figure 3:
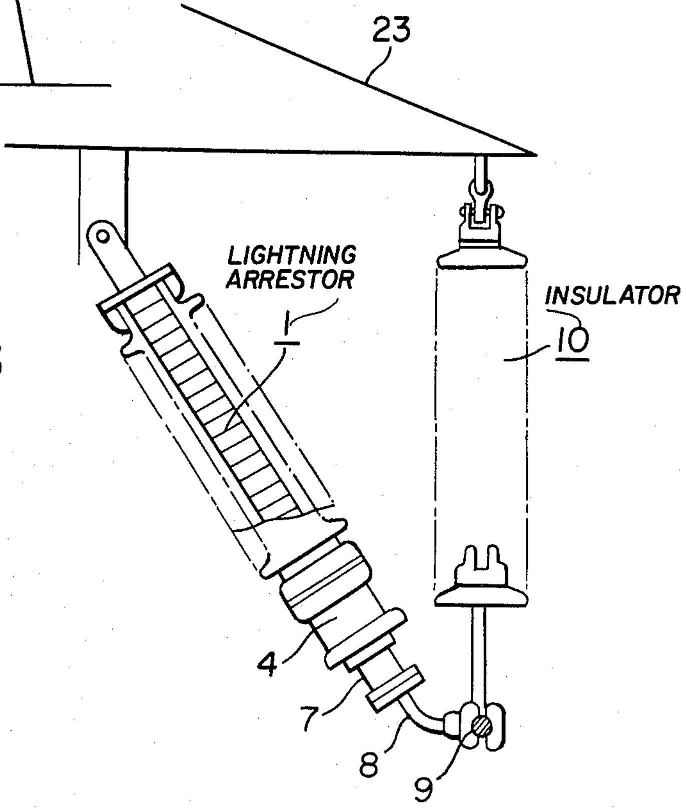
FIG. 3 is a schematic view showing an application of a device having a structure as in FIG. 2 to the power transmission line.
Figure 4:
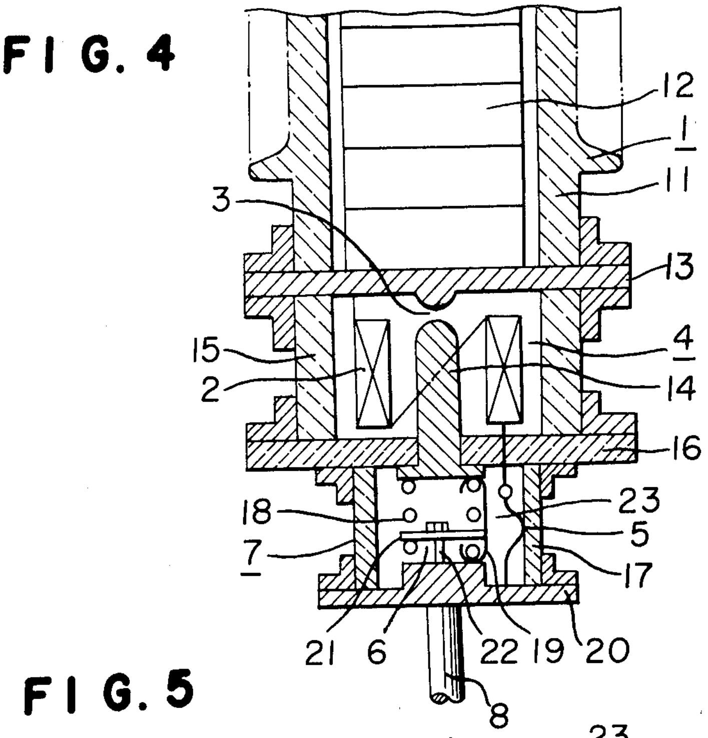
FIG. 4 is a sectional view of an important part of FIG. 3.

In FIGS. 2 to 4, the lightning arrester device for power transmission line comprises the lightning arrester (1); a gap section (4) including a reactor (2) and a gap (3) and a disconnecting section (7) including the fusible wire (5) and a switching part (6) as shown in FIG. 2. One end of the lightning arrester (1) is supported rotatably by the steel tower (23) and the disconnecting section (7) is connected through a connection fitting (8) to the power transmission line (9) which is separately supported by the suspension insulator (10). FIG. 2 shows an equivalent circuit in which the lightning arrester (1) and the suspension insulator (10) are shown as electrostatic capacities.

FIG. 4 shows an embodiment of the present invention. The lightning arrester (1) comprises a lightning arrester element, that is, a zinc oxide element (12) held in a porcelain tube (11). The gap section (4) comprises a flange (13) serving as a cover plate of the lightning arrester (1) and an electrode (14) which form the gap (3); the reactor (2) and an insulating tube (15). The reactor (2) and the electrode (14) pass through an insulating disc (16) to make connection with the fusible wire (5) and the disconnecting part (6) of the disconnecting section (7). The separating section (7) includes the fusible wire (5), the switching part (6) and an insulating tube (17) containing the fusible wire and the switching part. The switching part (6) comprises a compression spring (18), a shunt (19) for feeding current, a fixing plate (21) for fixing the compression spring (18) to a flange (20) and a bolt (22). The porcelain tube (11) and the insulating tubes (15), (17) are connected through the flange (13) and the insulating disc (16) in one piece thereby forming the compact lightning arrester device. The lightning arrester device is normally connected electrically through the serial connection of the reactor (2) and the fusible wire (5) between the steel tower (23) and the power transmission line (9).

The operation of the invention will be described.

Figure 5:
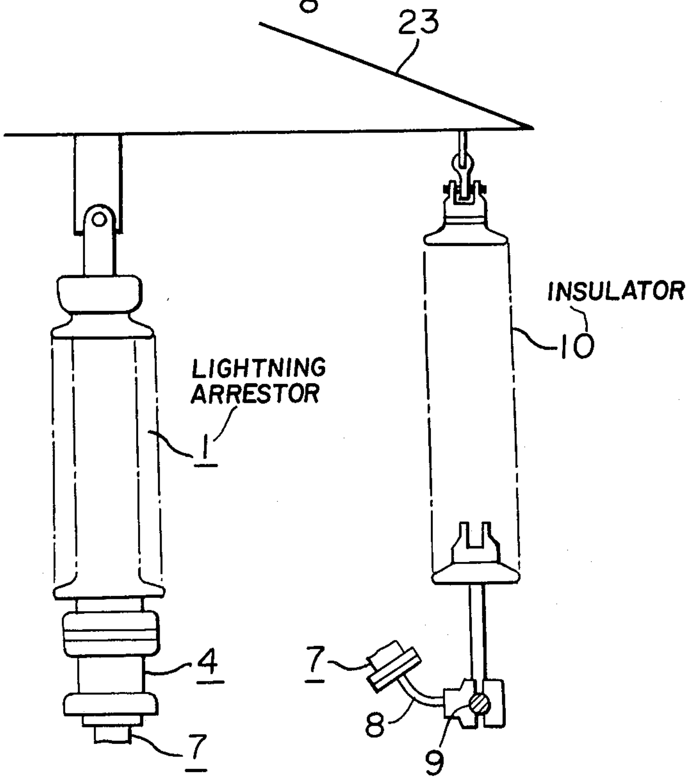
FIG. 5 is a diagram showing a state of a fusible wire molten.

In FIGS. 2 to 4, when the lightning arrester (1) is actuated by the lightning impulse, the impedance of the reactor (2) increases because of the high frequency so that the lightning current does not flow in the fusible wire (5) but the voltage is applied to the gap (3) and the lightning impulse current flows through the gap (3) and the shunt (19) to the connection fitting (8). On the other hand, the earth current of commercial frequency is passed to the lightning arrester (1) when it is in an abnormal state. However, the impedance of the reactor (2) is sufficiently low because of low frequency so that the earth current flows through the reactor (2) to the fusible wire (5). When the fusible wire (5) is cut-off by the earth current, an arc is produced in the cut-off portion to cause the increased pressure in a space (23) surrounded by the insulating tube (17) of the disconnecting section (7). The inner pressure can be increased to be higher than 1.0 atmospheric pressure by reducing the volume of the space (23) sufficiently. The insulating tube (17) can be broken by the increasing of the inner pressure so that the lightning arrester (1) is immediately separated from the power transmission line (9). FIG. 5 shows the state of the disconnecting section (7) having completed the disconnecting operation.

In accordance with the present invention, the lightning arrester, the reactor and the fusible wire are connected in series and the gap is connected in parallel with the serial connection of the reactor and the fusible wire. Accordingly, the lightning arrester can be immediately disconnected from the power transmission line by the melting of the fusible wire when the earth current is passed because the lightning impulse current is passed through the gap and the earth current is passed through the soluble wire.

The second insulating tube containing the fusible wire can be made to be broken by the increased pressure which is caused by the arc produced at the melting of the soluble wire so that the lightning arrester is disconnected from the power transmission line without fail.

We claim:

1. A lightning arrester device for a power transmission line which comprises a lightning arrester element comprising a sintered product made of a main component of zinc oxide; a serial connection of a reactor and fusible wire which is connected to the lightning arrester element in series; a serial connection of a gap and a disconnecting part connected in parallel with the serial connection of the reactor and the fusible wire wherein the fusible wire side is connected to the power transmission line and the lightning arrester element side is connected to the ground.

2. A lightning arrester device for power transmission line according to claim 1 wherein the lightning arrester element is held in a porcelain tube to form a lightning arrester; the reactor and the gap are held in a first insulating tube to form a gap section and the fusible wire and the disconnecting part are held in a second insulating tube to form a separating section.

3. A lightning arrester device for power transmission line according to claim 2 wherein the second insulating tube containing the fusible wire and the disconnecting part is broken by the increased pressure by the arc which is produced at the melting of the fusible wire so that the lightning arrester and the power transmission line are disconnected at the disconnecting part.

4. A lightning arrester device for power transmission line according to claim 2 wherein the porcelain tube, the first insulating tube and the second insulating tube are connected in one piece.

5. A lightning arrester device for power transmission line according to claim 4 wherein one end of the porcelain tube is rotatably supported by a steel tower and the second insulating tube is connected through a connection fitting to the power transmission line.

* * * * *